Sept. 17, 1963     A. R. MOSS     3,104,310
HIGH TEMPERATURE TORCHES

Filed Aug. 23, 1960     2 Sheets-Sheet 1

Inventor
By
Attorney

Sept. 17, 1963   A. R. MOSS   3,104,310
HIGH TEMPERATURE TORCHES
Filed Aug. 23, 1960   2 Sheets-Sheet 2

Inventor

By

Attorney

United States Patent Office 3,104,310
Patented Sept. 17, 1963

3,104,310
HIGH TEMPERATURE TORCHES
Ashley Robert Moss, Welling, England, assignor to National Research Development Corporation, London, England
Filed Aug. 23, 1960, Ser. No. 51,393
Claims priority, application Great Britain Aug. 24, 1959
7 Claims. (Cl. 219—75)

This invention relates to high temperature arc torches including constricted arc or plasma jet torches.

In such torches, the chemical composition of the plasma is often modified by the introduction of various substances into the jet in gaseous, liquid or powder form. Such additives include gases for producing special atmospheres, e.g. oxidizing or reducing; metal or ceramic powders for spraying and various compounds required for chemical synthesis. The invention provides a means whereby the introduction of such substances may be effected substantially uniformly around the jet.

The invention comprises a high temperature torch, having a plurality of orifices incorporated in a nozzle, around the axis of the jet, one end of each orifice having access to the flame or plasma and the other end communicating with a supply channel or container from which a desired additive may be passed to the orifices.

The orifices may be separate bores communicating with a common supply channel, for example an annular channel in the nozzle having an inlet through which additives in powder, liquid or gaseous form may be injected. Alternatively the orifices may consist of the pores in one or more inserts of porous material in the wall of the nozzle. In this form, which is particularly suitable for injecting gases or vapours, the additive would pass from a suitable supply channel or channels, through the pores, to the flame or plasma. The porous material may conveniently take the form of an annulus constituting part of the inner wall of the nozzle member of the torch and surrounded by an annular supply channel or container.

If desired, the orifices may be used to inject into the flame or plasma, vapours derived from liquid in a container which communicates with the orifices. The liquid may be vaporised by means of a suitable heating element before or during its passage through the orifices. Where the orifices consist of pores in a porous insert or inserts the porous material may, itself, constitute the heating element. For example a porous annulus having a high electrical resistance may be inserted in contact with two otherwise insulated parts of the torch body or nozzle which parts are arranged to be at different electrical potentials so that a current may be passed through the annulus. The resultant heating of the annulus may be used to vaporise liquid from a container or channel surrounding the outer surface of the annulus, the vapour being forced through the pores either by pressure built up in the container or by independently applied pressure. Such a vaporiser may be used, for example, to inject into the plasma of an arc torch, hydrogen and oxygen derived from water or hydrogen peroxide, or the lower boiling point fractions of mixtures.

The orifices or porous material may be in the wall of a secondary nozzle forward of the main nozzle. This arrangement is particularly useful for injecting into the plasma of an arc torch, substances which would contaminate, or cause excessive erosion of, the hot electrode. For example an air plasma may be produced by injecting nitrogen and oxygen either of which would tend to react with a hot electrode but would not react as readily with a cooled nozzle. If desired, argon could be added either through the same orifices or through a central duct.

Several forms of device in accordance with the invention and intended primarily for use with a constricted arc torch, will now be more particularly described by way of example only, with reference to the accompanying drawings in which.

Figure 1:
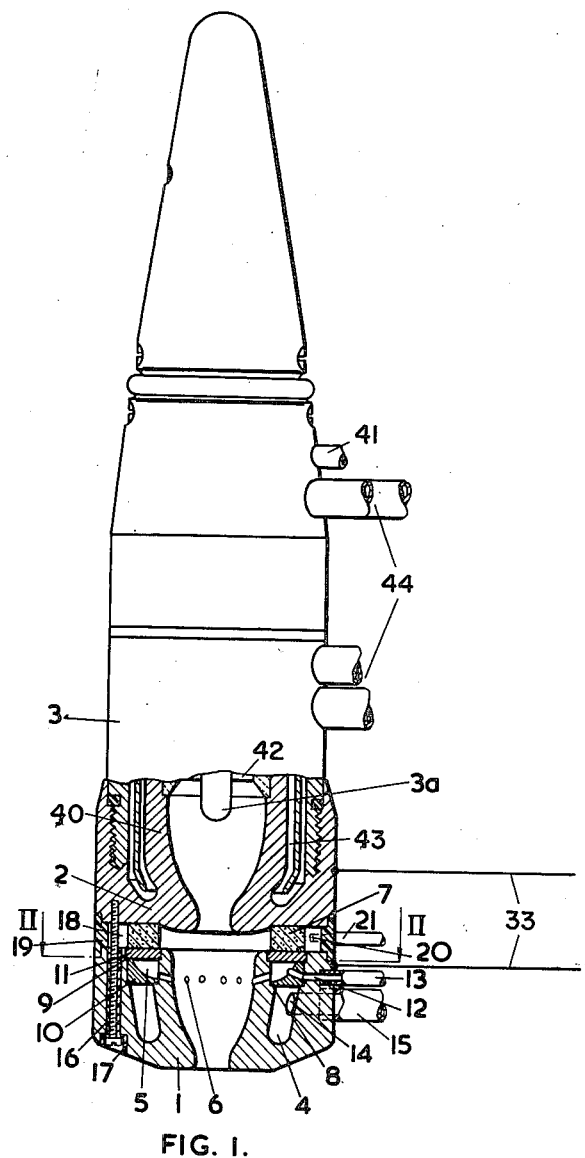
FIGURE 1 is a view of an arc torch, the nozzle end being sectioned longitudinally.
Figure 2:
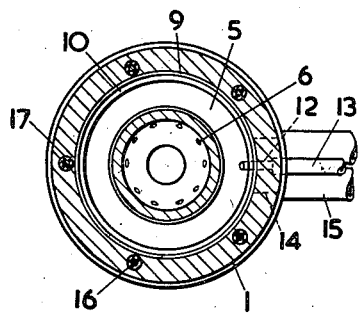
FIGURE 2 is a transverse section on the line II—II of FIGURE 1.

The device as shown in FIGS. 1 and 2 comprises an arc torch 3 having a tubular body 40 terminating in a constricting nozzle 2 and an electrode 3a within the body 3. A conduit 41 communicates with an annular channel 42 around the electrode 3a for the supply of a plasma forming fluid. In operation, an arc is struck between the electrode 3a and the nozzle 2 and a jet of plasma issues from the nozzle 2. To prevent erosion by the arc, the nozzle 2 and body 40 of the torch 3 are provided with coolant channels, such as shown at 43, to which coolant is supplied through conduits 44. A thick walled secondary nozzle 1, is attached coaxially to the main constricting nozzle 2 of the arc torch 3, and has a thick wall wherein are two annular channels, 4, 5; one, 4, for circulation of a coolant and a second 5, communicating through a ring of small orifices 6 with the interior of the nozzle 1, for the injection of additives. Additionally, an annular ring 7 of porous material is inserted between the nozzles 1, 2.

The channels 4, 5 are parts of a deep annular slot in the rear face of the secondary nozzle 1 which face is adjacent the main nozzle 2 of the torch 3. The slot walls are stepped outwardly on both sides at about one third of its depth and again at a short distance from the rear face of the nozzle to form two pairs of shoulders 8, 9. The innermost part of the slot, which forms the coolant channel 4 is sealed off by a ring 10 which rests on the inner pair of shoulders 8 and may be welded or brazed in position. Between the ring 10 and the outer pair of shoulders 9 is a second smaller channel 5 which is, in turn sealed off by a washer 11 resting on the outer pair of shoulders 9 and welded or brazed in position. This smaller channel 5 communicates with the interior of the nozzle 1 through a ring of equispaced, small, radial bores 6. A single bore 12 extends from the smaller channel 5 to the outer surface of the nozzle 1 into which is sealed an inlet pipe 13 through which additives may be supplied. The coolant channel 4 also communicates with the outer surface of the nozzle 1 through two bores 14 into which inlet and outlet coolant pipes 15 are sealed.

The secondary nozzle 1 is fixed to the main nozzle 2 of the torch 3 by means of bolts 16 parallel to the nozzle axis which are insulated from the secondary nozzle 1 by bushes 17 made of an insulating material.

In addition to the injection channel 5 and bores 6 described, an annular ring 7 of porous, high resistance material, such as a sintered metal is inserted between the secondary and main nozzles 1, 2 having its inner surface flush with the internal wall of the secondary nozzle 1. A channel 18 or container around the outer surface of the porous annulus 7 and between the two nozzles 1, 2 is formed by the insertion of an annular ring 19 of insulating material between the nozzles 1, 2 its outer surface being flush with the external wall surfaces of the nozzles, the insulating ring 19 being bored 20 to provide a filler orifice or entry for a feed tube 21. A gaseous additive may be fed into the nozzle 1 through the pores of the porous ring 7 or the ring may be heated as hereinbefore described to vaporise a liquid contained in or fed to the surrounding channel 18.

Figure 3:
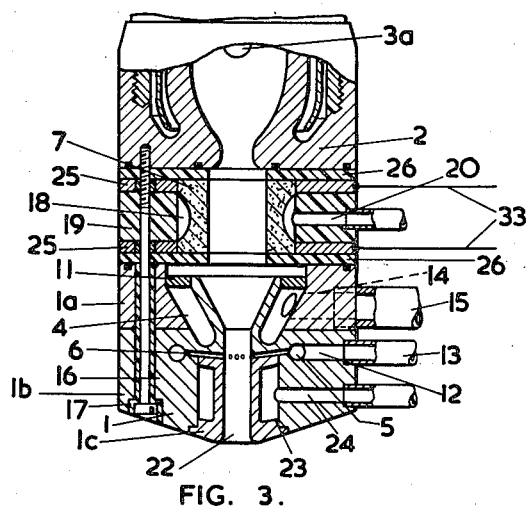
FIGURE 3 is a longitudinal section of the nozzle end of an arc torch showing an alternative arrangement.

In the alternative arrangement shown in FIGURE 3 the secondary nozzle 1 is of somewhat different construction and the porous annular ring 7 is incorporated in a separate wall section or unit which is inserted between the secondary nozzle 1 and the main nozzle 2 of an arc torch.

The secondary nozzle 1 which may be built up in several parts 1a, 1b, 1c for ease of construction carries a coolant channel 4 sealed at its upper end by a washer 11 and communicating through bores 14 with inlet and outlet pipes 15. The injection channel 5 is, in this modification, separate from the coolant channel 4 and communicates through a ring of orifices 6 with the interior of the nozzle 1. The orifices 6 enter the nozzle at points around its exit orifice 22. The injection channel 5 is fed through an inlet pipe 13 and a bore 12. The nozzle 1 may be elongated if desired to provide a longer exit orifice 22 and may contain an additional coolant channel 23 fed through an additional inlet 24. The secondary nozzle 1 is connected to the main nozzle 2 by bolts 16 surrounded by insulating bushes 17.

Between the secondary and main nozzles 1, 2 is inserted a unit comprising a porous annular ring 7 having a channel 18 in its outer surface, an insulating ring 19 which forms the outer wall of the channel 18, an inlet bore 20 through the insulating ring 19, two metal washers 25 one at either end of the ring 19 and each in contact with the porous annulus 7, and two insulating washers 26 one at each end of the unit. In this unit the annulus 7 may be heated by making electrical connections 33 through the metal washers 25. As an alternative, the insulating rings 26 may be omitted in which case the heating current may be derived from electrical connections to the two nozzles 1, 2. If desired the unit may be omitted in which case the secondary nozzle 1 would be bolted directly to the main nozzle 2.

Figure 4:
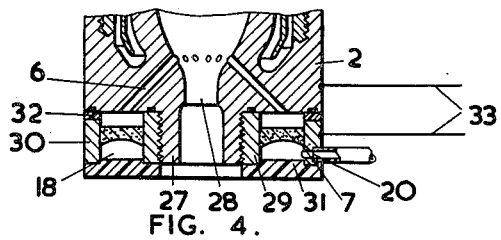
FIGURE 4 is a longitudinal section of a further alternative arrangement.

FIGURE 4 shows an arrangement wherein injection is carried out through the main nozzle 2 of an arc torch. A ring of orifices 6 communicate between the interior of the nozzle 2 and its outer end surface which is provided with an externally threaded extension 27 adjacent its exit orifice 28. Screwed onto the extension 27 is a unit comprising an inner, internally threaded metal ring 29, an outer metal ring 30, a porous annular ring 7 of sintered metal arranged transversely of the unit and welded to the metal rings 29, 30 at intermediate points of their lengths and an insulating closure washer 31 closing the outer end of the unit and forming the outer wall of a channel 18 on the side of the annular ring 7 remote from the nozzle 2. An inlet bore 20 is provided in the outer metal ring 30 giving access to the channel 18 and the inner end of the outer ring 30 is cut away to allow the insertion of an insulating washer 32 between the ring 30 and the nozzle 2. The annulus 7 may be heated electrically, connections 33 being made to the outer ring 30 and to either the inner ring 29 or the nozzle 2. The orifices 6 may be made of any convenient size and if desired the annulus 7 may be omitted to provide the simple orifice injection system.

As described, either or both injection systems may be provided in conjunction with a secondary nozzle 1 or in the main nozzle 2. Alternatively one system may be provided in the main and the other in a secondary nozzle. Where both systems are provided either may be used separately or they may be used in conjunction, for example to inject different additives.

I claim:

1. A high temperature arc torch for producing a jet of plasma which torch comprises a tubular body; a constricting nozzle at one end of the body; an electrode within the tubular body; a secondary nozzle on the side of the constricting nozzle remote from said electrode and forming jointly with said constricting nozzle a jet passage; an annular ring of porous material between the constricting and secondary nozzles, its inner surface being in communication with the jet passage; and a supply tube communicating with the outer surface of the annular ring for the supply of an additive thereto and then communicative to the jet passage.

2. A high temperature torch as claimed in claim 1 wherein the supply tube communicates with an annular channel formed around the outer surface of the porous annular ring.

3. A high temperature torch as claimed in claim 1 wherein the annular ring is made of a material having a high electrical resistance and means are provided for heating said ring by the passage of an electric current therethrough.

4. A high temperature torch as claimed in claim 1 wherein the annular ring is made of sintered metal.

5. A constricted arc or plasma jet torch as claimed in claim 1 wherein said annular ring is of sintered metal and wherein a larger diameter annulus of insulating material is between the said nozzles, the space between the annular ring and the annulus forming an annular injection channel which communicates, through the pores of the annular ring, with the interior of the secondary nozzle; an inlet tube communicating, through a bore in the annulus of insulating material, with said injection channel; and means for passing an electric current between the main and secondary nozzles, through the annular ring to heat the said annular ring.

6. A constricted arc or plasma jet torch as claimed in claim 1 wherein the secondary nozzle includes a detachable wall section adjacent the main nozzle, which wall section comprises said annular ring of sintered metal in whose outer surface is a circumferential groove; an insulating ring coaxial with and in contact with the outer surface of the annular ring; two metal washers, one at each end of the insulating ring and each in electrical contact with the annular ring; two insulating washers, one at each end of the detachable wall section to insulate the annular ring and the metal washers from the main and secondary nozzles; a supply tube communicating, through a bore in the insulating ring, with the circumferential groove in the annular ring, for the introduction of an additive into the groove and thence, through the pores in the annular ring, to the interior of the secondary nozzle; and means for passing an electric current through the metal washers and the annular ring to heat the annular ring.

7. A constricted arc or plasma jet torch comprising a tubular body; a central electrode within the body; a main nozzle at one end of the body; a thick-walled secondary nozzle attached to the exit side of the main nozzle and coaxial therewith, in the wall of which secondary nozzle is formed an annular coolant channel, an annular injection channel and a plurality of small bores communicating between the injection channel and the interior of the secondary nozzle; inlet and outlet tubes communicating through bores in the nozzle wall with the coolant channel and a further inlet tube communicating through a further bore in the nozzle wall with the injection channel for the supply of a desired additive to the injection channel and then through the small bores to the interior of the nozzle; a porous annular ring of sintered metal and a larger diameter annulus of insulating material inserted between the said nozzles, the two annuli forming therebetween a second annular injection channel which communicates through the pores of the annulus with the interior of the secondary nozzle; an inlet tube communicating through a bore in the annulus of insulating material with said second injection channel; and means for passing an electric current between the main and secondary nozzles through the porous annular ring to heat the said annular ring.

References Cited in the file of this patent

UNITED STATES PATENTS

| | | |
|---|---|---|
| 2,444,900 | Meincke | July 6, 1948 |
| 2,858,411 | Gage | Oct. 28, 1958 |
| 2,862,099 | Gage | Nov. 25, 1958 |
| 2,967,926 | Edstrom | Jan. 10, 1961 |